(No Model.)

F. STAPP.
MINNOW HOLDER FOR FISH HOOKS.

No. 531,140. Patented Dec. 18, 1894.

WITNESSES:
G. J. Dellamet.
Chas. E. Dawson.

INVENTOR
Frederick Stapp
BY A. J. O'Brien
ATTORNEY

THE NORRIS PETERS CO., PHOTO-LITHO., WASHINGTON, D. C.

United States Patent Office.

FREDERICK STAPP, OF DENVER, COLORADO.

MINNOW-HOLDER FOR FISH-HOOKS.

SPECIFICATION forming part of Letters Patent No. 531,140, dated December 18, 1894.

Application filed March 2, 1894. Serial No. 502,043. (No model.)

*To all whom it may concern:*

Be it known that I, FREDERICK STAPP, a citizen of the United States of America, residing at Denver, in the county of Arapahoe and State of Colorado, have invented certain new and useful Improvements in Minnow-Holding Devices for Fish-Hooks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in devices for retaining bait upon fish-hooks; and is specially designed for use when minnows or very small fish are used for bait.

Every one who has had much experience in fishing, or who is in fact, at all familiar with the practice, is aware of the importance of retaining the minnow on the hook. This kind of bait is usually very scarce, and difficult to obtain. Hence, the necessity of retaining the same upon the hook until a fish is caught. When, however, minnows are abundant, much valuable time is usually lost through the necessity of frequently replenishing the bait; and even where time is not an object, the work of frequently applying bait to the hook is disagreeable and annoying. With a view to overcoming this difficulty, I have devised what I term a minnow holder, consisting of a simple device for use in connection with the ordinary fish-hook, whereby it becomes practically impossible to lose a minnow from the hook before a fish is caught.

My improved device is very simple in construction, inexpensive, easily applied; and consists of the features hereinafter described and claimed, all of which will be fully understood by reference to the accompanying drawings in which is illustrated an embodiment thereof.

Figure 1:
Figure 2:
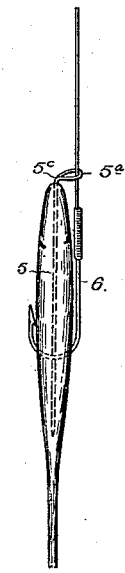
Figure 3:

In the drawings, Figure 1 is a side elevation of a minnow attached to a fish-hook, showing the fastening device partly inserted. Fig. 2 is an edge view of the minnow, with the fastening device fully inserted. Fig. 3 is a perspective view in detail of my improved device.

Like characters of reference indicate the same parts in the views, from which it will be observed that the minnow holder consists of a shank 5 provided with an eye $5^a$ connected with the top of the shank by an offset $5^c$. This shank terminates at one extremity in an arrow-shaped point, and is provided with very short barbs located intermediate the point and the offset at the top. These barbs are pointed toward the head or eye extremity of the shank, whereby they have a tendency when the shank is inserted, to retain the minnow in place thereon.

The use of the device in connection with a fish-hook and minnow is illustrated in the drawings.

To use the minnow holder, it is first threaded on the hook by passing the barbed extremity of the hook through the eye of the device, which is then moved upward on the line out of the way; after which, the minnow is pierced by the hook. The point of the device is then inserted in the mouth of the minnow and pressed into its body to the full length of the shank. The upper part of the hook is then in the eye of the device, which, by reason of the offset at the top, retains the shank of the hook in a position approximately parallel with the body of the minnow, whereby the latter is always held in the proper position upon the hook. Since the minnow cannot turn on the hook, there is no tendency to enlarge the opening formed by piercing its body with the hook. Hence, it cannot work loose or wash off under any circumstances. This feature is very important when we consider the rapid flow of many of our trout streams, particularly those of the Rocky Mountain country. These mountain streams abound in trout, but the current is so swift that it is very difficult to retain bait upon the hook under ordinary circumstances.

My improved device being inserted lengthwise of the minnow, the latter is pulled through the water in the natural manner, and cannot be washed off by these rapid currents. Neither can the bait be "stolen" by the fish without being caught.

Having thus described my invention, what I claim is—

As an improved article of manufacture, and in combination with an ordinary fish hook to which the line is attached, the herein described minnow holder consisting of the straight shank having the sharp point, and terminating at the top or opposite extremity in an eye bent out of line with the shank, and adapted to receive the shank of the hook when in a position parallel with the shank of the device, the latter being provided with short barbs located intermediate its extremities, as and for the purpose set forth.

In testimony whereof I affix my signature in the presence of two witnesses.

FREDERICK STAPP.

Witnesses:
G. J. ROLLANDET,
CHAS. E. DAWSON.